(12) United States Patent
Iwasaki et al.

(10) Patent No.: US 8,507,116 B2
(45) Date of Patent: Aug. 13, 2013

(54) MAGNETIC RECORDING MEDIUM AND MANUFACTURING METHOD THEREOF

(75) Inventors: Takeshi Iwasaki, Inagi (JP); Kaori Kimura, Yokohama (JP); Yoshiyuki Kamata, Tokyo (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/175,485

(22) Filed: Jul. 1, 2011

(65) Prior Publication Data

US 2012/0028076 A1    Feb. 2, 2012

(30) Foreign Application Priority Data

Jul. 29, 2010   (JP) ................................ 2010-171136

(51) Int. Cl.
     *G11B 5/127*      (2006.01)
(52) U.S. Cl.
     USPC .................... 428/836.2; 428/836.3
(58) Field of Classification Search
     None
     See application file for complete search history.

(56) References Cited

U.S. PATENT DOCUMENTS

| | | | | |
|---|---|---|---|---|
| 2008/0274381 A1* | 11/2008 | Fullerton et al. | ............ | 428/846.3 |
| 2009/0123660 A1* | 5/2009 | Inaba et al. | .................... | 427/535 |
| 2009/0214895 A1* | 8/2009 | Hinoue et al. | ................ | 428/827 |
| 2009/0273861 A1* | 11/2009 | Tanaka et al. | ................. | 360/254 |
| 2010/0000965 A1 | 1/2010 | Kamata et al. | | |
| 2010/0232054 A1 | 9/2010 | Mabuchi et al. | | |
| 2011/0132752 A1* | 6/2011 | Shirotori et al. | .............. | 204/281 |

FOREIGN PATENT DOCUMENTS

| | | |
|---|---|---|
| JP | 4319057 | 8/2005 |
| JP | 2007-220164 | 8/2007 |
| JP | 2009-116979 | 5/2009 |
| JP | 2009-170007 | 7/2009 |
| JP | 2009-199691 | 9/2009 |
| JP | 2010-092525 | 4/2010 |
| JP | 2010-218610 | 9/2010 |
| JP | 2010-244666 | 10/2010 |

OTHER PUBLICATIONS

Information Sheet for preparing an Information Disclosure Statement, undated, in two pages.

* cited by examiner

*Primary Examiner* — Holly Rickman
(74) *Attorney, Agent, or Firm* — Knobbe, Martens, Olsen & Bear, LLP

(57) ABSTRACT

According to one embodiment, a magnetic recording medium includes a substrate, a soft magnetic layer, an underlayer, a magnetic recording layer, and a protective layer, wherein the magnetic recording layer is provided with a pattern including recording portions and non-recording portions, the non-recording portions have a composition that is equal to a composition obtained by demagnetizing the recording portions, the non-recording portions contain at least one metal element selected from the group consisting of vanadium and zirconium and at least one element selected from the group consisting of nitrogen, carbon, boron and oxygen, and the at least one element selected from the group consisting of nitrogen, carbon, boron and oxygen is contained in the non-recording portions at a higher content than the content of the at least one element selected from the group consisting of nitrogen, carbon, boron and oxygen in the recording portions.

15 Claims, 4 Drawing Sheets

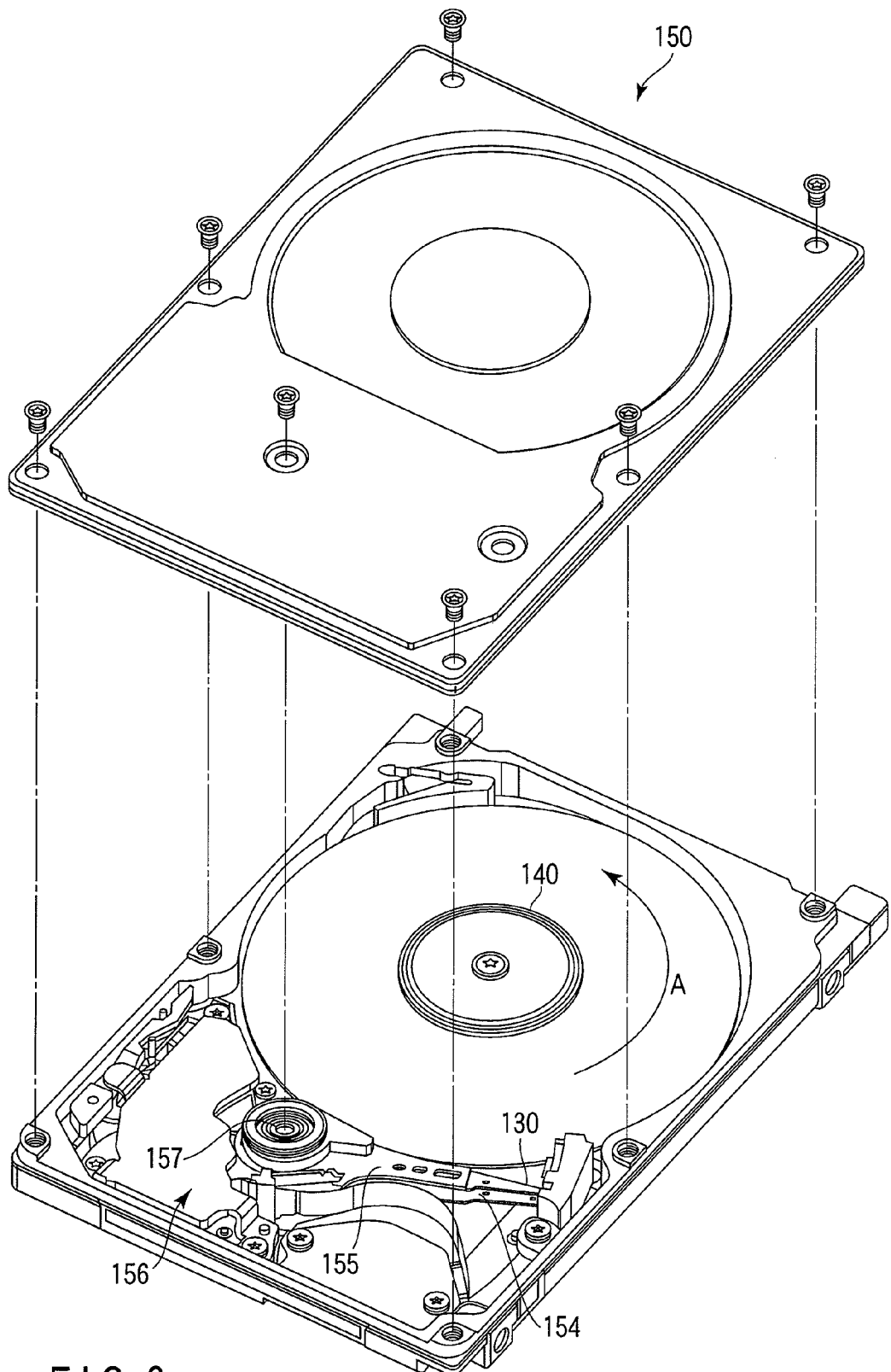
F I G. 6

MAGNETIC RECORDING MEDIUM AND MANUFACTURING METHOD THEREOF

CROSS-REFERENCE TO RELATED APPLICATIONS

This application is based upon and claims the benefit of priority from Japanese Patent Application No. 2010-171136, filed Jul. 29, 2010, the entire contents of which are incorporated herein by reference.

FIELD

Embodiments described herein relate generally to a magnetic recording medium such as a patterned medium and to a manufacturing method thereof.

BACKGROUND

In the information-oriented society in recent years, the amount of data to be stored in a recording medium is continually increasing. For this reason, a recording apparatus and a recording medium with an outstandingly high recording capacity have been desired. Also, hard disks, which are currently in an increasing demand as an economical recording medium of high capacity, are expected to be required to have recording density of 1 tera-bit or more per square inch, which is ten times the current density, in coming years.

In a magnetic recording medium used in conventional hard disks, a predetermined region of a thin film including polycrystals of magnetic fine particles is used as one bit for recording. In order to increase recording capacity of a magnetic recording medium, the recording density should be increased. In other words, it is necessary to reduce the recording mark size which is usable for recording of one bit. However, when the recording mark size is simply reduced, the influence of noise which depends on the shapes of magnetic fine particles becomes nonnegligible. If the particle size of magnetic fine particles is reduced to lower the noise, a problem of thermal fluctuation occurs, which makes it impossible to maintain recorded data at a room temperature.

In order to avoid these problems, a bit patterned medium (BPM) has been proposed, in which the recording material is separated by a nonmagnetic material in advance, and a single magnetic dot is used as a single recording cell to perform read and write.

In magnetic recording media installed in HDDs, there is an arising problem of the interference between adjacent tracks which inhibits improvement in track density. Particularly, reducing a fringe effect of a write head field is a significant technical problem to be solved. To solve this problem, there has been developed a discrete track recording-type patterned medium (DTM), in which the magnetic recording layer is processed so that the recording tracks are physically separated from each other. In the DTM, it is possible to reduce side erase which erases information in the adjacent tracks in writing and side read which reads information in the adjacent tracks in reading. On this account, the DTM is promising as a magnetic recording medium capable of providing a high recording density. Incidentally, it should be noted that the term "patterned medium" as used herein in a broad sense includes the bit patterned medium and DTM.

With respect to methods for manufacturing the BPM and the DTM as described above, there are known a method wherein a pattern of protrusions and recesses is formed on the surface of a magnetic recording layer by way of fine working such as etching, and a method wherein a pattern consisting of magnetic regions and non-magnetic regions of a magnetic layer is formed by way of chemical treatment. With respect to the latter method, various methods are known, including, for example, a method wherein specific regions of the magnetic recording layer are exposed to a magnetically deactivating gas to thereby deactivate the magnetism of the specific regions, a method wherein specific regions are deactivated by the injection of an ionized element by making use of a plasma beam, etc., and a method wherein a deactivating material is deposited on specific regions to thereby allow the material to diffuse into the specific regions.

In spite of these conventional techniques now available, it is still demanded to manufacture a magnetic recording medium wherein the magnetism of non-recording regions of the magnetic recording medium can be efficiently and sufficiently deactivated.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 6 is a perspective view showing a magnetic recording apparatus mounting a magnetic recording medium manufactured according to one embodiment.

DETAILED DESCRIPTION

Various embodiments will be described hereinafter with reference to the accompanying drawings.

In general, according to one embodiment, a magnetic recording medium comprises a substrate, a soft magnetic layer on the substrate, an underlayer on the soft magnetic layer, a magnetic recording layer on the underlayer, and a protective layer on the magnetic recording layer, wherein the magnetic recording layer is provided with a pattern including recording portions and non-recording portions, the non-recording portions have a composition that is equal to a composition obtained by demagnetizing the recording portions, the non-recording portions contain at least one metal element selected from the group consisting of vanadium and zirconium and at least one element selected from the group consisting of nitrogen, carbon, boron and oxygen, and the at least one element selected from the group consisting of nitrogen, carbon, boron and oxygen is contained in the non-recording portions at a higher content than the content of the at least one element selected from the group consisting of nitrogen, carbon, boron and oxygen in the recording portions.

<Magnetic Recording Medium>

Figure 1:
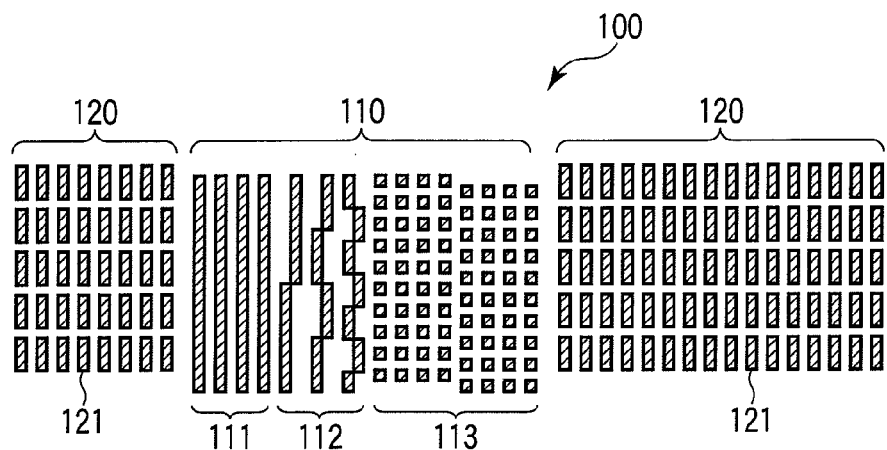
FIG. 1 is a plan view taken along the circumferential direction of a bit-patterned medium according to one embodiment.

FIG. 1 shows a plan view of a bit patterned recording medium (BPM) which is an example of the patterned medium 100 of the embodiment along the circumferential direction. As shown in FIG. 1, servo regions 110 and data regions 120 are alternately formed along the circumferential direction of the medium. The servo region 110 includes a preamble section 111, an address section 112 and a burst section 113. In this patterned medium, magnetic dots 121 are formed in the data region 120.

Figure 2:
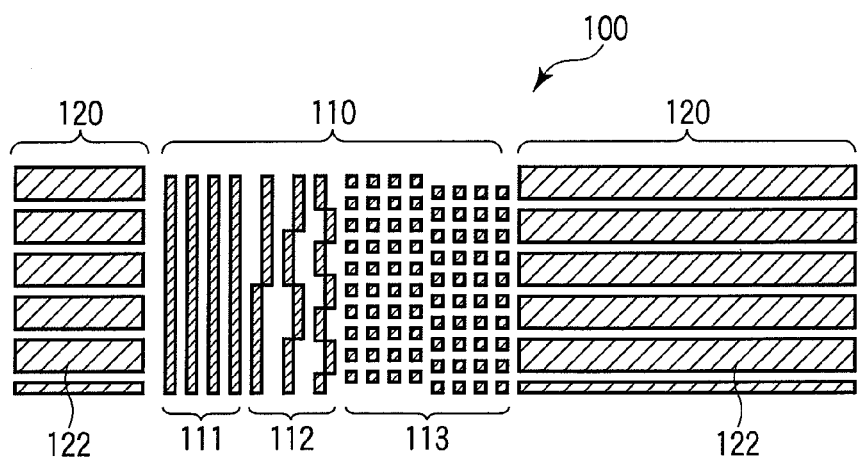
FIG. 2 is a plan view taken along the circumferential direction of a DTR medium according to one embodiment.

FIG. 2 shows a plan view of a discrete track recording medium (DTM) which is another example of the patterned medium manufactured of the embodiment along the circumferential direction. The data region 120 includes discrete tracks 120 wherein adjacent tracks are separated from each other.

Figure 3:
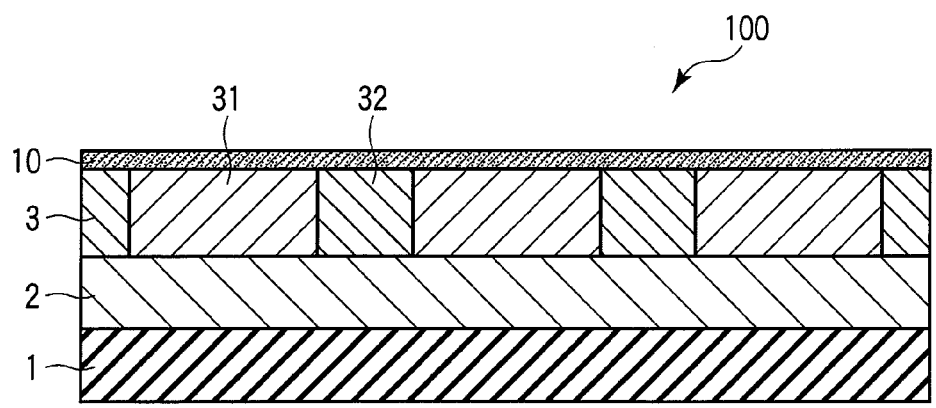
FIG. 3 is a cross-sectional view showing one example of a magnetic recording medium according to one embodiment.

FIG. 3 shows a cross-sectional view of one example of a magnetic recording medium 100 according to one embodiment. The magnetic recording medium 100 according to this embodiment comprises a stacked layer including a soft magnetic layer (CoTaZr) having a thickness of 40 nm and an underlayer (Ru) for orientation control having a thickness of 20 nm (in FIG. 3, both layers are inclusively shown as an underlayer 2), a magnetic recording layer 3 (CoPtCr) having a thickness of 20 nm and including recording regions 31 having magnetism and non-recording regions 32 having no magnetism, a protective layer 10 formed of diamond-like carbon (DLC) and having a thickness of 4 nm, and a lubricating layer (not shown), all of these layers being formed on the surface of a glass substrate 1.

The patterns shown in FIGS. 1 and 2 are constituted by the recording regions 31 and non-recording regions 32 shown in FIG. 3. Namely, the structure represented by a rectangle in FIGS. 1 and 2 corresponds to the recording regions 31 of FIG. 3.

<Manufacturing Method of a Magnetic Recording Medium According to a First Embodiment>

FIGS. 4A, 4B, 4C, 4D, 4E, 4F, 4G, 4H, 4I, 4J and 4K respectively illustrate a manufacturing method of a magnetic recording medium according to a first embodiment. The following is an explanation of this manufacturing method.

Figure 4A:
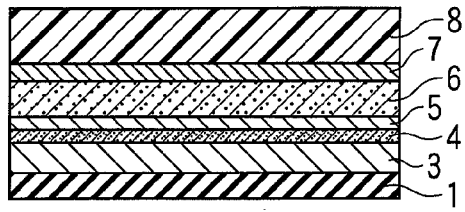
FIGS. 4A, 4B, 4C, 4D, 4E, 4F, 4G, 4H, 4I, 4J and 4K respectively show a cross-sectional view illustrating a manufacturing method of a magnetic recording medium according to a first embodiment.

As shown in FIG. 4A, a soft magnetic layer (CoTaZr) having a thickness of 40 nm (not shown), an underlayer (Ru) for orientation control having a thickness of 20 nm (not shown), a magnetic recording layer 3 (CoPtCr) having a thickness of 20 nm and a DLC layer 4 having a thickness of 4 nm are successively deposited on the surface of a glass substrate 1. Furthermore, a first hard mask 5 made of Mo and having a thickness of 5 nm, a second hard mask 6 made of C and having a thickness of 25 nm, and a third hard mask 7 made of Si and having a thickness of 3 nm are successively deposited on the DLC layer 4. Furthermore, a resist 8 is spin-coated on the third hard mask (Si) 7 to a thickness of 50 nm. Meanwhile, a stamper provided with a pattern of protrusions and recesses corresponding to the pattern shown in FIG. 1 or FIG. 2 for example is prepared. This stamper can be manufactured by a series of processes including EB drawing, Ni electrocasting and injection molding. The stamper is disposed in a manner to make the pattern thereof face the resist 8.

Figure 4F:
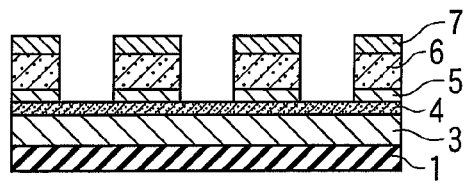
Figure 4B:
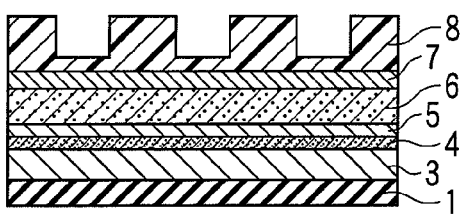

As shown in FIG. 4B, the stamper is imprinted in the resist 8, thereby transferring the pattern of protrusions and recesses of the stamper to the resist 8. Thereafter, the stamper is taken out. A residue of the resist is left on the bottom of the recessed portions of the pattern that has been transferred to the resist 8.

Figure 4G:
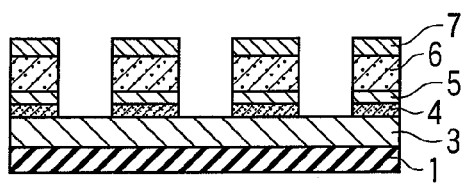
Figure 4C:
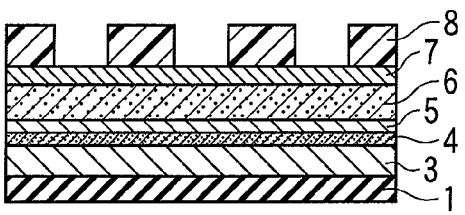

As shown in FIG. 4C, by way of dry etching, the residual resist existing in the recessed portions is removed to allow the surface of the third hard mask 7 (Si) to be exposed. This step can be carried out, for example, by making use of an inductively coupled plasma (IPC)-reactive ion etching (RIE) apparatus, wherein $CF_4$ is used as a process gas, the pressure inside the chamber is set to 0.1 Pa, the coil RF power and the platen (bias) RF power are set to 100 W and 50 W, respectively, and the etching time is set to 60 seconds.

Figure 4H:
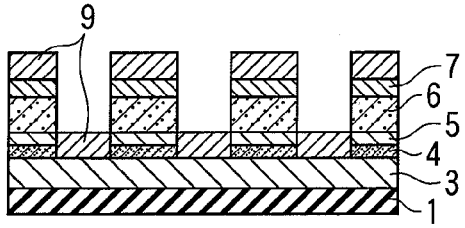
Figure 4D:
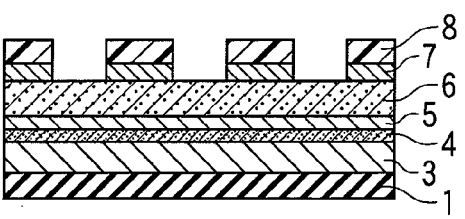

As shown in FIG. 4D, by making use of the patterned resist as a mask, the pattern is transferred to the third hard mask 7 (Si) by means of ion beam etching, thereby allowing the second hard mask 6 (C) to be exposed at the recessed portions. This step can be carried out, for example, by making use of the IPC-RIE apparatus, wherein $CF_4$ is used as a process gas, the pressure inside the chamber is set to 0.1 Pa, the coil RF power and the platen RF power are set to 100 W and 50 W, respectively, and the etching time is set to 20 seconds.

Figure 4I:
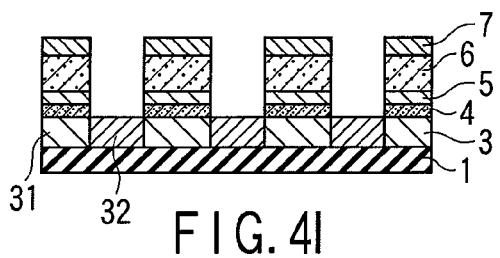
Figure 4E:
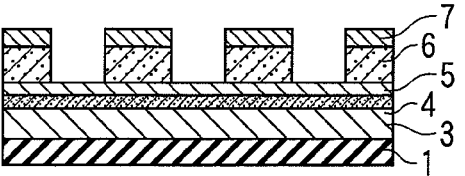

As shown in FIG. 4E, by making use of the patterned third hard mask 7 (Si) as a mask, the second hard mask 6 made of C is etched to transfer the pattern to the second hard mask 6, thereby allowing the surface of the first hard mask 5 (Mo) to be exposed at the recessed portions. This step can be carried out, for example, by making use of the IPC-RIE apparatus, wherein $O_2$ is used as a process gas, the pressure inside the chamber is set to 0.1 Pa, the coil RF power and the platen RF power are set to 100 W and 50 W, respectively, and the etching time is set to 20 seconds.

As shown in FIG. 4F, by making use of the patterned second hard mask 6 (C) as a mask, the first hard mask 5 made of Mo is etched to transfer the pattern to the first hard mask 5, thereby allowing the surface of the DLC layer 4 to be exposed at the recessed portions. This step can be carried out, for example, by making use of an ion-milling apparatus, wherein Ar gas is used, the gas pressure is set to 0.06 Pa, accelerating voltage is set to 400 W, and the etching time is set to 10 seconds.

As shown in FIG. 4G, by making use of the patterned first hard mask 5 (Mo) as a mask, the DLC layer 4 is etched to transfer the pattern to the DLC layer 4, thereby allowing the surface of the magnetic recording layer 3 to be exposed at the recessed portions. This step can be carried out, for example, by making use of the IPC-RIE apparatus, wherein $O_2$ is used as a process gas, the pressure inside the chamber is set to 0.1 Pa, the coil RF power and the platen RF power are set to 100 W and 50 W, respectively, and the etching time is set to 5 seconds.

As shown in FIG. 4H, as a magnetism-deactivating layer 9, a vanadium layer having a thickness of 10 nm is deposited on the surfaces of the mask and the magnetic recording layer 3. This deposition can be carried out, for example, by means of DC sputtering using Ar gas, wherein the pressure inside the chamber is set to 0.7 Pa, the power is set to 500 W, and the deposition time is set to 10 seconds. As a result of this step, the magnetism-deactivating layer 9 is allowed to deposit on the surface of the mask at the portions where the mask exists and also on the surface of the magnetic recording layer 3 at the portions where the mask does not exist.

As shown in FIG. 4I, the vanadium element contained in the magnetism-deactivating layer 9 is allowed to diffuse into the magnetic recording layer 3. This step can be carried out, for example, by making use of an electron cyclotron resonance (ECR) ion gun, wherein $N_2$ gas is used, the gas pressure is set to 0.1 Pa, the microwave power is set to 1000 W, accelerating voltage is set to 5000V, and treating time is set to 10 seconds. As a result, the vanadium is allowed to diffuse selectively into specific regions of magnetic recording layer 3 which are not covered with the mask, thereby creating non-recording portions 32 exhibiting non-magnetism. On the other hand, the regions of magnetic recording layer 3 covered with the mask are turned into recording portions 31 retaining magnetism. In the processes described with reference to FIGS. 4A, 4B, 4C, 4D, 4E, 4F, 4G, 4H, 4I, 4J and 4K, the volume of the non-recording portions 32 is kept almost the same before and after the diffusion of vanadium. As a result, the thickness of the recording portions 31 is approximately the same as that of the non-recording portions 32 even after the diffusion of vanadium.

Figure 4J:
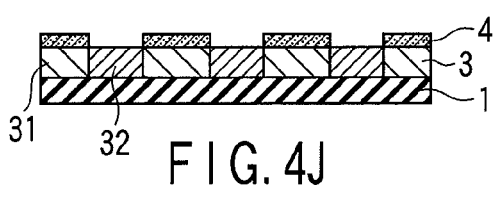

As shown in FIG. 4J, the first hard mask 5 (Mo) which has been left is removed together with the layers deposited thereon. This step can be carried out, for example, by dipping the medium in a stripping solvent and then by separating the mask from the DLC layer 4. With respect to the stripping solvent, it is possible to employ, for example, an aqueous solution of hydrogen peroxide. When the medium is dipped into this aqueous solution of hydrogen peroxide and left to stand for one minute, the first hard mask 5 (Mo) as well as the masks thereon can be entirely separated from the DLC layer 4.

Figure 4K:
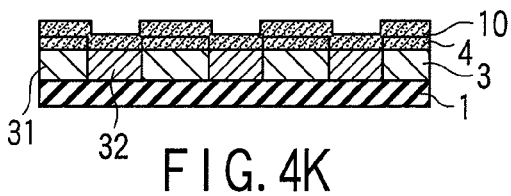

Thereafter, as shown in FIG. 4K, by means of a chemical deposition method (CVD), the protective layer 10 formed of diamond-like carbon (DLC) and having a thickness of 4 nm is deposited and then a lubricating agent (not shown) is coated thereon to obtain a magnetic recording medium.

<Manufacturing Method of a Magnetic Recording Medium According to a Second Embodiment>

FIGS. 5A, 5B, 5C, 5D, 5E, 5F, 5G, 5H, 5I, 5J and 5K respectively illustrate a manufacturing method of a magnetic recording medium according to a second embodiment. In the method shown in FIGS. 5A, 5B, 5C, 5D, 5E, 5F, 5G, 5H, 5I, 5J and 5K, the steps of FIGS. 5A, 5B, 5C, 5D, 5E, 5F, 5G and 5H can be carried out in the same manner as described in the steps of FIGS. 4A, 4B, 4C, 4D, 4E, 4F, 4G and 4H. Therefore, the step of FIG. 5I and the steps following the step of FIG. 5I will be explained below.

Figure 5A:
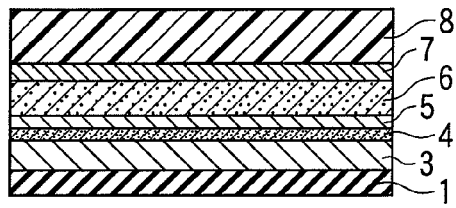
FIGS. 5A, 5B, 5C, 5D, 5E, 5F, 5G, 5H, 5I, 5J and 5K respectively show a cross-sectional view illustrating a manufacturing method of a magnetic recording medium according to a second embodiment.
Figure 5B:
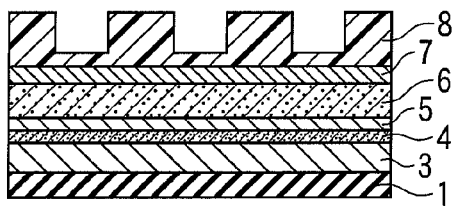
Figure 5C:
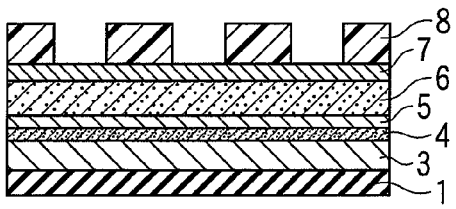
Figure 5D:
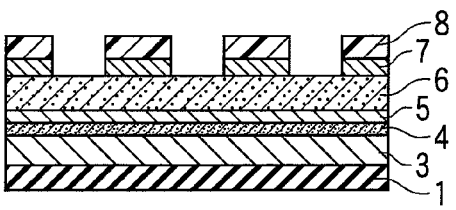
Figure 5E:
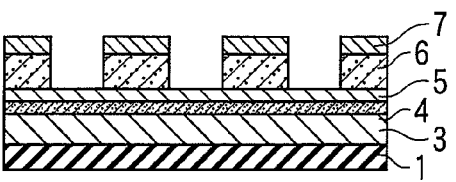
Figure 5F:
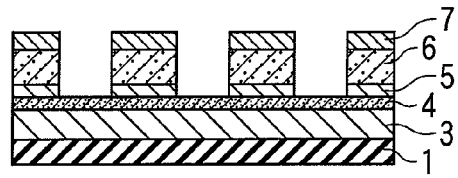
Figure 5G:
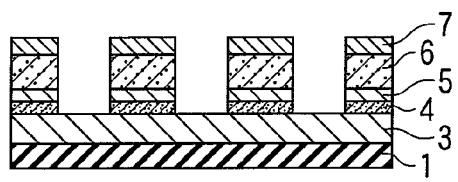
Figure 5H:
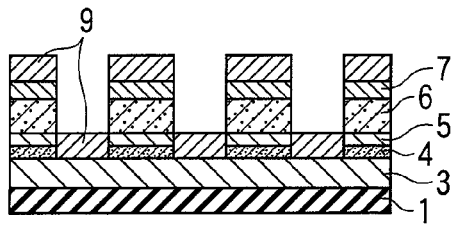
Figure 5I:
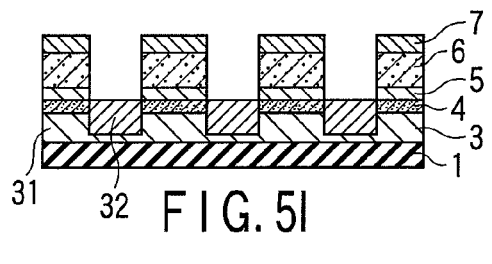

As shown in FIG. 5I, the vanadium element contained in the magnetism-deactivating layer 9 is allowed to diffuse into the magnetic recording layer 3. This step differs from the step of FIG. 4I in the respect that the conditions for carrying out the diffusion of vanadium are adjusted so as to reduce the density of the non-recording portions 32, thereby expanding the volume of non-recording portions 32. This step can be carried out, for example, by making use of an ECR ion gun, wherein $N_2$ gas is used, gas pressure is set to 0.1 Pa, the microwave power is set to 1000 W, accelerating voltage is set to 5000V, and treating time is set to 100 seconds. As a result, the volume of non-recording portions 32 is enabled to increase and hence the height of non-recording portions 32 from the substrate 1 increases to almost the same height as that of the DLC layer 4 as measured from the substrate 1.

Figure 5J:
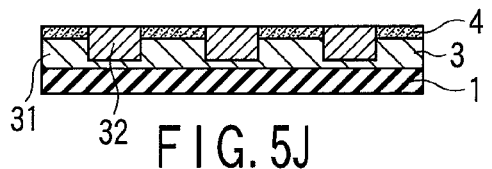

As shown in FIG. 5J, the first hard mask 5 (Mo) which is left is removed together with the layers deposited thereon. This step can be carried out, for example, by dipping the medium in a stripping solvent and then by separating the mask from the DLC layer 4. With respect to the stripping solvent, it is possible to employ, for example, an aqueous solution of hydrogen peroxide. When the medium is dipped into this aqueous solution of hydrogen peroxide and left to stand for one minute, the first hard mask 5 (Mo) as well as the masks thereon can be entirely separated from the DLC layer 4.

Figure 5K:
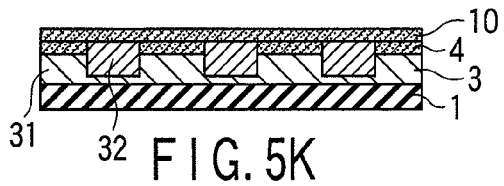

Thereafter, as shown in FIG. 5K, by means of CVD, the protective layer 10 formed of DLC and having a thickness of 4 nm is deposited and then a lubricating agent (not shown) is coated thereon to obtain a magnetic recording medium. The medium to be obtained from the method shown in FIGS. 5A, 5B, 5C, 5D, 5E, 5F, 5G, 5H, 5I, 5J and 5K would not be so influenced by the pattern of protrusions and recesses origi-nating from the recording portions 31 and non-recording portions 32 and hence the surface smoothness of the medium can be more enhanced.

<Magnetism-Deactivating Layer and Non-Recording Portions>

Next, the magnetism-deactivating layer 9 will be further explained in detail.

The magnetism-deactivating layer 9 contains at least one metal element selected from the group consisting of vanadium and zirconium. More specifically, the magnetism-deactivating layer 9 comprises, as a major component, at least one metal element selected from the group consisting of vanadium and zirconium each in a form of elementary substance, nitride, carbide, oxide or boride, or a mixture of any of these materials.

In the manufacturing method according to the embodiment, as shown in FIG. 4H or FIG. 5H for example, the magnetism-deactivating layer 9 is deposited on a patterned mask after the patterned mask has been formed on the surface of the magnetic recording layer 3. The deposition of the magnetism-deactivating layer 9 can be carried out, for example, by means of DC sputtering using Ar gas, wherein the pressure inside the chamber is set to 0.7 Pa, the power is set to 500 W, and the deposition time is set to 10 seconds. Further, in order to obtain the nitrides or oxides of vanadium or zirconium, it is possible to employ a reactive sputtering wherein Ar gas is mixed with nitrogen gas or oxygen gas. In this manner, the magnetism-deactivating layer 9 having a thickness of 10 nm can be deposited on the surface of the magnetic recording layer 3 or on the surface of the mask. In this case, the magnetism-deactivating layer 9 is deposited on the surface of the mask in the regions where the mask exists and also on the surface of the magnetic recording layer 3 in the regions where the mask does not exist.

After finishing the deposition of the magnetism-deactivating layer 9, the magnetism-deactivating layer 9 is allowed to diffuse into the magnetic recording layer 3. This diffusion can be executed, for example, by means of ion beam irradiation using a gas containing at least one element selected from the group consisting of nitrogen, carbon, boron and oxygen. In this case, the diffusion to the magnetic recording layer 3 is effected from the magnetism-deactivating layer 9 existing at the recessed portions of the mask pattern. Incidentally, by the term "diffusion", it is intended to include not only the phenomenon of the migration of elements constituting the magnetism-deactivating layer 9 into the magnetic recording layer 3 but also a phenomenon of forming a solid solution or an alloy through an interaction between an element contained in the magnetism-deactivating layer 9 and an element constituting the magnetic recording layer 3 or a phenomenon of forming a compound through the reaction between an element contained in the magnetism-deactivating layer 9 and an element constituting the magnetic recording layer 3.

With respect to the gas to be used for the ion beam irradiation, it is possible to use a gas containing at least one element selected from the group consisting of nitrogen, carbon, boron and oxygen. For example, it is possible to use a gas containing at least one gas selected from the group consisting of $N_2$, $CH_4$, $B_2H_6$, $O_2$ and $O_3$. The gas useful in this case may contain He. With respect to the time of irradiating the ion beam, it may be suitably selected from a period of time ranging from 5 seconds to 1200 seconds for example. With respect to the conditions for the ion beam irradiation, it is possible to employ, as one example, a method using an ECR ion gun wherein $N_2$ gas is used, gas pressure is set to 0.1 Pa, the microwave power is set to 1000 W, accelerating voltage is set to 5000V, and treating time is set to 100 seconds.

Next, the features of non-recording portions 32 will be explained in detail.

The non-recording portions 32 are formed through the diffusion of the magnetism-deactivating layer 9 into the magnetic recording layer 3. Owing to the effects of diffusion of the magnetism-deactivating layer 9, the magnetism of non-recording portions 32 is deactivated. These non-magnetic non-recording portions 32 are designed, together with the recording portions 31 retaining magnetism, to form a pattern as shown in FIG. 1 or FIG. 2.

The non-recording portions 32 contain not only an element contained in the magnetic recording layer 3 but also an element contained in the magnetism-deactivating layer 9. Under some circumstances, the non-recording portions 32 may contain an element contained in the gas to be used in the ion beam irradiation to be performed for the diffusion. More specifically, the non-recording portions 32 contain at least one metal element selected from the group consisting of vanadium and zirconium and at least one element selected from the group consisting of nitrogen, carbon, boron and oxygen.

The content of at least one metal element selected from the group consisting of vanadium and zirconium and contained in the non-recording portions 32 is preferably not less than 10 atomic % (at %), more preferably not less than 20 at %.

The content of at least one element selected from the group consisting of nitrogen, carbon, boron and oxygen, which is to be contained in the non-recording portions 32 should preferably be controlled such that it is at least 2 at %, more preferably at least 5 at % higher than the content of at least one element selected from the group consisting of nitrogen, carbon, boron and oxygen, which is to be contained in the recording portions 31.

Next, advantages to be derived from the formation of the non-recording portions 32 by way of the diffusion of the magnetism-deactivating layer 9 will be explained below.

(Advantages of Selecting Vanadium or Zirconium)

It is possible, through the diffusion of magnetism-deactivating layer 9 into the magnetic recording layer 3, to efficiently and sufficiently deactivate the magnetism of the non-recording portions 32. Namely, since vanadium is capable of forming a solid solution (solid solution regions are partially formed) together with any one of Co, Cr and Pt constituting the magnetic recording layer 3, it is relatively easy to enable vanadium to diffuse into the magnetic recording layer 3. On the other hand, in the case of zirconium, since the enthalpy of formation (AH) of zirconium with Co bearing the magnetism of the magnetic recording layer 3 is higher in the negative direction, zirconium can be easily formed into an alloy together with Co. Because of this, zirconium is enabled to easily diffuse into the magnetic recording layer 3 of Co type. Further, nitrogen, carbon, boron and oxygen are provided in themselves with an effect of deactivating the magnetism of Co and, at the same time, are capable of forming a compound together with vanadium or zirconium and further together with chromium. As a result, it is possible to promote the diffusion of vanadium or zirconium, thereby making it possible to sufficiently demagnetize the magnetic recording layer 3.

Whereas, when metals other than vanadium and zirconium are used as in the case of the prior art, it is impossible to sufficiently solid-solubilize them in the magnetic recording layer because of the reasons that the solid-solubilizing effects thereof to Co, Cr and Pt are weak and the enthalpy of formation in the negative direction is not sufficiently high. Further, since the diffusing effect of them is weak, it is impossible to sufficiently deactivate the magnetism of the magnetic recording layer. For example, in the cases of Cr and Mn, although the solid solution zone thereof is relatively high, the diffusing effect of Cr is weak and Mn itself may exhibit magnetism, thereby making it impossible to sufficiently deactivate the magnetism. Furthermore, when it is tried to deactivate the magnetism by using only vanadium or zirconium as in the case of the prior art, the effect of diffusion, especially the solid-solubilizing effect, would be weak and, hence, it would be impossible to sufficiently deactivate the magnetism.

(Advantages of Selecting the Kinds of Gas)

The execution of the diffusion of magnetism-deactivating layer 9 containing vanadium or zirconium by making use of a gas containing at least one element selected from the group consisting of nitrogen, carbon, boron and oxygen is effective in deriving magnetism-deactivating effects of these gases as well as in obtaining the effects of achieving enhanced diffusivity due to the crystal destruction resulting from the creation of compounds to be formed between vanadium or zirconium and the gas.

Further, the inclusion of He in the aforementioned gas (for example, $N_2$—He mixed gas) is effective in promoting the diffusion of vanadium or zirconium in the non-recording portions due to the additional effect of He to enhance amorphousness, thus making it possible to increase the degree of the deactivation of magnetism. Additionally, owing to the decrease of density due to the enhanced amorphousness, the volume of the non-recording portions is caused to expand. Since it is possible to create recording portions having a relatively high density and non-recording portions having a relatively low density as described above, a difference in height between the recessed portions and the protruded portions originating from the recording portions and the non-recording portions can be minimized or avoided.

Moreover, if a compound is formed through a reaction between at least one element selected from the group consisting of nitrogen, carbon, boron and oxygen and vanadium or zirconium contained in the magnetic recording layer 3, the density of the non-recording portions can be decreased relatively and hence the volume thereof will be expanded. As a result, a difference in height between the recessed portions and the protruded portions originating from the recording portions and the non-recording portions can be minimized or avoided.

Whereas, if it is tried to diffuse vanadium or zirconium by making use of an inert gas mainly containing a rare gas as in the case of the prior art, it is impossible to expect the aforementioned magnetism-deactivating effects to be brought about by at least one element selected from the group consisting of nitrogen, carbon, boron and oxygen. Furthermore, it is impossible to expect the effect of promoting the diffusion as well as the effect of expansion that can be derived from the formation of a compound. In the case of the method to diffuse a compound directly into the magnetic recording layer as seen in the prior art, it is impossible to expect the effects of creating a solid solution or an alloy through an interaction between vanadium or zirconium and Co, Cr or Pt to thereby make it impossible to achieve a sufficient demagnetization. Additionally, it is impossible to expect the effects to be brought about by the formation of a compound from a reaction between nitrogen, carbon, boron or oxygen and other elements contained in the magnetic recording layer.

<Other Materials and Process>

Next, each of the constituent elements contained in a magnetic recording medium according to the embodiments will be explained.

(Magnetic Recording Layer and Recording Portions)

A perpendicular magnetic recording layer contains, for example, Co, Cr and Pt. In the case BPM, the perpendicular magnetic recording layer should preferably be constructed such that the grain boundary thereof is as small as possible. If constructed in this manner, the recording bit can be reversed almost as a single grain on the occasion of forming recording bits through working. In the case DPM, it may contain oxides in addition to Co, Cr and Pt. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 5 mol % or more and 15 mol % or less and more preferably 8 mol % or more and 12 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 5 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are degraded, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Ti, Ru and Mn besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 3 to 30 nm and more preferably 5 to 20 nm. When the thickness is in this range, a magnetic recording apparatus suitable to higher recording density can be manufactured. If the thickness of the perpendicular magnetic recording layer is less than 3 nm, read outputs are too low and noise components tend to be higher. If the thickness of the perpendicular magnetic recording layer exceeds 30 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be degraded. The perpendicular squareness of the perpendicular magnetic recording layer is preferably 0.8 or more. If the perpendicular squareness is less than 0.8, the thermal fluctuation resistance tends to be degraded.

(Substrate)

As the substrate, for example, a glass substrate, an Al-based alloy substrate, a ceramic substrate, a carbon substrate or an Si single crystal substrate having an oxide surface may be used. As the glass substrate, an amorphous glass and a crystallized glass are used. Examples of the amorphous glass may include a general-purpose soda lime glass and an alumino-silicate glass. As the crystallized glass, a lithium-based crystallized glass may be exemplified. Examples of the ceramic substrate may include a sintered material containing, as a major component, a general-purpose aluminum oxide, an aluminum nitride, silicon nitride or the like, and fiber-reinforced materials thereof. As the substrate, it is also possible to use the above-described metal substrates or nonmetal substrates with a NiP layer formed thereon by plating or sputtering.

(Soft Magnetic Underlayer and Underlayer)

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An interlayer made of a nonmagnetic material may be formed between the soft magnetic underlayer and the recording layer. The interlayer has two functions including the function to cut the exchange coupling interaction between the soft magnetic underlayer and the recording layer and the function to control the crystallinity of the recording layer. As the material for the interlayer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

(Nonmagnetic Interlayer)

In the embodiments, an interlayer made of a nonmagnetic material may be formed between the soft magnetic underlayer and magnetic recording layer. The interlayer has two functions, i.e., a function to interrupt the exchange coupling interaction between the soft magnetic underlayer and recording layer, and a function to control the crystallinity of the recording layer. The interlayer is preferably a layer of Ru, Re, Pt, Pd, Ti, or a crystalline alloy containing one of these elements. To improve the crystal orientation of the perpendicular magnetic recording layer, the film thickness of the interlayer is preferably 1 to 30 nm. Also, the crystal orientation plane is preferably (0002) for Ru, Re, and Ti, and (111) for Pt and Pd. This makes it possible to obtain a high Ku value and high thermal stability.

The above-mentioned materials except for Ti are favorable as the interlayer material because they have a corrosion resistance against dry etching gases such as $CF_4$ and $SF_6$. In the manufacture of the medium, a dry etching step using a gas such as $CF_4$ or $SF_6$ as an etching gas may be performed. In this case, the material of the interlayer preferably has a corrosion resistance against the etching gas, in order to prevent characteristic deterioration caused by deterioration of the interlayer, e.g., magnetic characteristic deterioration or microstructure shape deterioration due to corrosion. Note that Ti is corroded by etching gases such as $CF_4$ and $SF_6$, but usable as the interlayer material when selecting, e.g., $O_2$ as an etching gas because Ti has a corrosion resistance against $O_2$. Note also that the interlayer may be a multilayered film including two or more layers.

(Protective Layer)

The protective layer is provided for the purpose of preventing corrosion of the perpendicular magnetic recording layer and also preventing the surface of a medium from being damaged when the magnetic head is brought into contact with the medium. Examples of the material of the protective layer include those containing C, Si, B, $SiO_2$ or $ZrO_2$. It is preferable to set the thickness of the protective layer from 1 to 10 nm. Since such a thin protective layer enables to reduce the spacing between the head and medium, it is suitable for high-density recording. Carbon may be classified into $sp^2$-bonded carbon (graphite) and $sp^3$-bonded carbon (diamond). Though sp3-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and sp3-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective layer for magnetic recording media. The deposition of DLC by chemical vapor deposition (CVD) produces DLC through excitation and decomposition of raw gas in plasma and chemical reactions, and therefore, DLC richer in sp3-bonded carbon can be formed by adjusting the conditions.

Next, preferable conditions and other matters required in each of the steps in the manufacturing method will be explained.

(Formation of Mask)

A first hard mask, a second hard mask and a third hard mask are sequentially deposited on the surface of the DLC layer 4.

As for the first hard mask, it can be formed by depositing, for example, Mo to a thickness of 5 nm. Alternatively, it is also possible to employ Cr, Zn, Al, etc. As for the second hard mask, it can be formed by depositing, for example, C to a thickness of 25 nm. Alternatively, it is also possible to employ an ordinary photoresist such as PMMA, ZEP, etc. As for the third hard mask, it can be formed by depositing, for example, Si to a thickness of 3 nm. Alternatively, it is also possible to employ SiC, Ti, $SiO_2$, SOG (Spin-on-glass), Ta, etc.

Incidentally, in the manufacturing method of the embodiments described herein, the aforementioned first hard mask, second hard mask and third hard mask may not be necessarily required to be used. It is possible, in place of these hard masks, to employ a mask which is capable of forming any optional pattern on the surface of the magnetic recording layer and of being separated from the magnetic recording layer after finishing the diffusion of the magnetism-deactivating layer.

(Imprinting)

A stamper having patterns of recording tracks and servo data is pressed against a substrate on which a resist is applied and then the resist is cured, thereby to transfer the patterns of protrusions and recesses.

As the resist, for example, a UV curing resist or a general novolak-type photoresist may be used. When the UV curing resist is used, the stamper is preferably made of a transparent material such as quartz or resin. The UV curing resist is cured by applying ultraviolet ray. A high-pressure mercury lamp, for example, can be used as a light source of the ultraviolet ray. When the general novolak-type photoresist is used, the stamper may be made of a material such as Ni, quartz, Si and SiC. The resist can be cured by applying heat or pressure.

(Residue Removal)

The resist residue is removed by gaseous $O_2$ reactive ion etching (RIE) after the imprint. Although an inductively coupled plasma-RIE (ICP-RIE), which can generate a plasma at a high density at a low pressure, is preferable, an electron cyclotron resonance-RIE (ECR-RIE) or a general capacitive coupled plasma-RIE (CCP-RIE) may also be used.

(Deposition of Protective Layer and Post-Treatment)

The carbon protective layer may be deposited to obtain good coverage over the protrusions and recesses preferably by means of CVD, but it may be deposited also by means of sputtering or vacuum deposition. When CVD is used, a DLC film containing a large amount of $sp^3$ bonded carbon is formed. A lubricant is applied to the surface of the protective layer. As the lubricant, for example, a perfluoropolyether, fluorinated alcohol, fluorinated carboxylic acid or the like may be used.

(Stripping)

After the patterning of the magnetic recording layer is finished, the stripping of the first hard mask is executed. By the expression "stripping of the first hard mask", it is intended to mean a treatment for exposing the surface of an underlayer disposed on the underside of the first hard mask. The second hard mask and the third hard mask remaining on the surface of the first hard mask can be removed together with the stripping of the first hard mask. The stripping of the first hard mask can be carried out by way of a wet process. With respect to the stripping solvent, it is possible to employ, for example, an aqueous solution of hydrogen peroxide, hydrochloric acid, sulfuric acid, nitric acid, etc. In order to prevent the magnetic recording layer from being damaged, it is more preferable to employ a dilute acid exhibiting a pH of not less than 4. The first hard mask can be stripped off by simply dipping the recording medium in this stripping solvent for around one minute. According to this stripping method, it is possible to strip off the first hard mask without giving any damage to the magnetic recording layer. It is preferable to wash the magnetic recording layer with water or a solvent after the stripping thereof so as to completely remove the stripping solvent.

<Magnetic Recording Apparatus>

Now, the magnetic recording apparatus (HDD) comprising the magnetic recording medium of the embodiment will be described below. FIG. 6 is a perspective view of a magnetic recording apparatus in which the magnetic recording medium manufactured according to the embodiment is installed.

As shown in FIG. 6, the magnetic recording apparatus 150 according to the embodiment is of a type using a rotary actuator. The magnetic recording medium is attached to the spindle 140, and is rotated in the direction of arrow A by a motor (not shown) that responds to control signals from a drive controller (not shown). The magnetic recording apparatus 150 may comprise a plurality of magnetic recording medium.

The head slider 130 configured to read from and write to the magnetic recording medium is attached to the tip of the film-like suspension 154. The head slider 130 has a magnetic head mounted near the tip thereof. When the magnetic recording medium rotates, the air bearing surface (ABS) of the head slider 130 is held at a predetermined height so as to fly over the surface of the magnetic recording medium under a balance of pressing force of the suspension 154 and the pressure produce on the air bearing surface (ABS) of head slider 130.

The suspension 154 is connected to one end of an actuator arm 155. A voice coil motor 156, a kind of linear motor, is provided on the other end of the actuator arm 155. The voice coil motor 156 is formed of a magnetic circuit including a driving coil (not shown) wound around a bobbin and a permanent magnet and a counter yoke arranged opposite to each other so as to sandwich the coil therebetween. The actuator arm 155 is held by ball bearings (not shown) provided at two vertical positions of the pivot 157. The actuator arm 155 can be rotatably slid by the voice coil motor 156. As a result, the magnetic head can be accessed any position on the magnetic recording medium.

EXAMPLES

Examples 1-10

Bit-patterned media of Examples 1-10 and Comparative Examples 1-9 were manufactured and various characteristics thereof were investigated.

The general features of these media manufactured herein will be described below. In the cases of the media of Examples 1-10 and Comparative Examples 5-9, a magnetism-deactivating layer comprising vanadium, etc. was stacked on a magnetic recording layer and then the diffusion of the magnetism-deactivating layer was performed by the ion beam irradiation using various kinds of gas. In the cases of the media of Comparative Examples 1-4, ion injection of various kinds of elements was conducted to a magnetic recording layer.

Each of these media was manufactured as described below.

A glass substrate (amorphous substrate MEL 5, 2.5 inches in diameter; Konica Minolta Co.) was placed in a deposition chamber of a DC magnetron sputtering apparatus (C-3010; Anelver Co.) and then the interior of the deposition chamber was evacuated until the degree of vacuum was increased to $1 \times 10^{-5}$ Pa. Then, a film of Co-7 at % Ta-5 at % Zr having a thickness of 40 nm was deposited, as a soft magnetic layer, on the surface of the substrate, thereby forming a soft magnetic underlayer. Then, an interlayer (Ru) having a thickness of 20 nm and a perpendicular magnetic recording layer of Co-20 at % Pt-10 at % Cr having a thickness of 20 nm were deposited. Next, by means of a CVD method, a DLC protective layer having a thickness of 4 nm was deposited. Thereafter, a first hard mask formed of No and having a thickness of 5 nm, a second hard mask formed of C and having a thickness of 25 nm and a third hard mask formed of Si and having a thickness of 3 nm were successively deposited. Furthermore, a resist was spin-coated on the surface of the third hard mask (Si) to a thickness of 50 nm.

Then, a patterned mask was formed on the surface of a magnetic recording layer as described below. First of all, a stamper having a predetermined pattern of protrusions and recesses formed by means of EB drawing, Ni electrocasting or injection molding was imprinted in the resist, thereby transferring the pattern of the stamper to the resist. Thereafter, the stamper was taken out. Since a residue of the resist was left on the bottom of the recessed portions of the pattern transferred to the resist, dry etching was performed by making use of an IPC-RIE apparatus, wherein $CF_4$ was used as a process gas, the chamber pressure was set to 0.1 Pa, the coil RF power and the platen (bias) RF power were set to 100 W and 50 W, respectively, and the etching time was set to 60 seconds. As a result, the residue of the resist left remaining in the recessed portions was removed, thereby allowing the surface of third hard mask (Si) to be exposed. Then, by making use of the patterned resist as a mask and by means of the IPC-RIE apparatus, ion beam etching was performed, wherein $CF_4$ was used as a process gas, the pressure inside the chamber was set to 0.1 Pa, the coil RF power and the platen RF power were set to 100 W and 50 W, respectively, and etching time was set to 20 seconds. As a result, the pattern was transferred to the third hard mask (Si) and the surface of the second hard mask (C) was exposed at the recessed portions. Then, by making use of the patterned third hard mask (Si) as a mask and by means of the IPC-RIE apparatus, the etching of the second hard mask formed of C was performed, wherein $O_2$ was used as a process gas, the pressure inside the chamber was set to 0.1 Pa, the coil RF power and the platen RF power were set to 100 W and 50 W, respectively, and etching time was set to 20 seconds. As a result, the pattern of the third hard mask (Si) was transferred to the second hard mask (C) and the surface of the first hard mask (Mo) was exposed at the recessed portions. Then, by making use of the patterned second hard mask (C) as a mask and by making use of an ion milling apparatus, the etching of the first hard mask formed of Mo was performed, wherein Ar gas was used, the gas pressure was set to 0.06 Pa, the accelerating voltage was set to 400V, and etching time was set to 10 seconds. As a result, the pattern was transferred to the first hard mask and the surface of the DLC layer was exposed at the recessed portions. Then, by making use of the patterned first hard mask (Mo) as a mask and by means of the ICP-RIE apparatus, the etching of the DLC layer was performed, wherein $O_2$ gas was used as a process gas, the pressure inside the chamber was set to 0.1 Pa, the coil RF power and the platen RF power were set to 100 W and 50 W, and etching time was set to 5 seconds. As a result, the pattern was transferred to the DLC layer and the surface of the magnetic recording layer was exposed at the recessed portions.

Thereafter, the demagnetization of the non-recording portions and the processes succeeding thereto were performed.

As a representative example, in the case of the recording medium of Example 1, the demagnetization was performed as described below. By means of DC sputtering using Ar gas, vanadium was deposited as a magnetism-deactivating layer on the surface of the magnetic recording layer to a thickness of 10 nm, wherein the pressure inside the chamber was set to 0.7 Pa, the power was set to 500 W and the depositing time was set to 10 seconds. Then, by making use of an ECR ion gun using $N_2$ gas, diffusion of the vanadium element to the magnetic recording layer was performed, wherein the gas pressure was set to 0.1 Pa, the microwave power was set to 1000 W, the accelerating voltage was set to 5000V, and treating time was set to 100 seconds. In the cases of the recording media of Examples 2-10 and Comparative Examples 5-9, the demagnetization was performed in the same manner as described in Example 1 except that the compound to be used as the magnetism-deactivating layer and the kind of gas to be used for the diffusion were changed. In the cases of Comparative Examples 1-4, the demagnetization was performed by irradiating a plasma beam to the magnetic recording layer using various kinds of elements.

As a post treatment following the aforementioned demagnetization, the medium was dipped in an aqueous solution of hydrogen peroxide for one minute, thereby entirely removing the first hard mask (Mo) and layers deposited thereon. Then, by means of the CVD method, the DLC protective layer was deposited to a thickness of 4 nm and then a lubricating agent was coated thereon by means of a dipping method, thus obtaining various kinds of patterned perpendicular magnetic recording medium.

The media thus manufactured were measured in terms of read/write characteristics, static magnetic characteristics, surface roughness and the content of vanadium in the magnetic recording layer.

In order to assess the read/write characteristics, the electromagnetic conversion characteristics of the medium was measured by making use of a read/write analyzer RWA1632 and a spin stand S1701MP (both available from GUZIK Co. USA). More specifically, by making use of a head provided, at the writing portion thereof, with a shielded pole type magnetic pole which is a shield-attached single pole type magnetic pole (the shield acts to converge the magnetic flux to be emitted from a magnetic head) and also provided, at the reading portion thereof, with a TMR element, the signal-to-noise ratio (SNR) was measured with the condition of recording frequency being set to 1400 kBPI in linear recording density.

The measurement of surface roughness was performed by making use of an AFM (Veeco Co.). Specifically, the measurement was performed with the tapping mode of 256×256 resolution in a view-field of 10 μm.

The assessment of static magnetic characteristics was performed by making use of a vibration sample type magnetometer (VSM) (available from Riken Denshi Co.). Further, in order to investigate the magnetization corresponding to the non-recording portions, a medium having the magnetic recording layer thereof subjected, through its entire top surface, to diffusion treatment without using a mask (a medium whose top surface is entirely constituted by non-recording portions) was separately prepared and the magnetization thereof was measured.

Further, the observation and measurement of these media were performed, through their cross-sections, by making use of a transmission electron microscope (TEM) and energy dispersive X-ray spectroscopy (EDX) to thereby measure the content of vanadium in their magnetic recording layers.

The results thus measured are summarized in Table 1. In this Table 1, the read/write characteristics are shown as SNR, the static magnetic characteristics as Ms, and the surface roughness as Ra.

TABLE 1

| | Demagnetizing layer | Gas | Content (at %) of V in non-recording portions | Ms of non-recording portions (emu/cc) | SNR (dB) | Ra (nm) |
|---|---|---|---|---|---|---|
| Ex. 1 | Vanadium | $N_2$ | 30 | 0 | 13.6 | 0.3 |
| Ex. 2 | Vanadium | He—$N_2$ | 30 | 0 | 13.8 | 0.2 |
| Ex. 3 | Vanadium nitride | $N_2$ | 30 | 0 | 12.5 | 0.4 |
| Ex. 4 | Vanadium nitride | He—$N_2$ | 30 | 0 | 12.7 | 0.2 |
| Ex. 5 | Vanadium carbide | $N_2$ | 30 | 0 | 11.3 | 0.4 |
| Ex. 6 | Vanadium carbide | He—$N_2$ | 30 | 0 | 11.8 | 0.3 |
| Ex. 7 | Vanadium oxide | $N_2$ | 30 | 0 | 11.5 | 0.5 |
| Ex. 8 | Vanadium oxide | He—$N_2$ | 30 | 0 | 11.9 | 0.3 |
| Ex. 9 | Vanadium boride | $N_2$ | 30 | 0 | 11.2 | 0.5 |

TABLE 1-continued

|  | Demagnetizing layer | Gas | Content (at %) of V in non-recording portions | Ms of non-recording portions (emu/cc) | SNR (dB) | Ra (nm) |
|---|---|---|---|---|---|---|
| Ex. 10 | Vanadium boride | He—$N_2$ | 30 | 0 | 11.4 | 0.4 |
| Comp. Ex. 1 | Chromium | (Ion injection) | 30 | 110 | 9.5 | 1.8 |
| Comp. Ex. 2 | Vanadium | (Ion injection) | 30 | 100 | 9.8 | 1.7 |
| Comp. Ex. 3 | Zirconium | (Ion injection) | 30 | 120 | 9.7 | 1.9 |
| Comp. Ex. 4 | Tantalum | (Ion injection) | 30 | 250 | 6.5 | 1.9 |
| Comp. Ex. 5 | Chromium | Ar | 30 | 130 | 8.8 | 2.3 |
| Comp. Ex. 6 | Vanadium | Ar | 30 | 100 | 9.0 | 2.2 |
| Comp. Ex. 7 | Zirconium | Ar | 30 | 110 | 9.3 | 2.4 |
| Comp. Ex. 8 | Tantalum | Ar | 30 | 300 | 6.3 | 2.4 |
| Comp. Ex. 9 | Vanadium | Kr | 30 | 120 | 9.1 | 2.8 |

As seen from Table 1, the media of Examples 1-10 indicated excellent SNR as compared with the media of Comparative Examples. The reason for this can be assumably attributed to the fact that while the magnetization (Ms) of the non-recording portions was made zero so that magnetic interference between bits was prevented in the cases of the media of Examples 1-10, the Ms of the non-recording portions was left so that magnetic interference between bits was allowed to take place in the case of the media of Comparative Examples, resulting in an increase in noise. Furthermore, the surface roughness (Ra) of the media of Examples 1-10 was improved as compared with the media of Comparative Examples 1-9. Owing to this improvement, it was assumed that the head-floating characteristics of the medium of each of Examples was improved as compared with the media of Comparative Examples. Meanwhile, the existence of vanadium was not recognized in the recording regions in the media of Examples 1-10. On the other hand, the existence of vanadium was recognized in the non-recording regions as shown in Table 1.

Examples 11-20

Bit-patterned media of Examples 11-20 and Comparative Example 10 were manufactured and various characteristics thereof were investigated.

The general features of these media manufactured herein will be described below. A magnetism-deactivating layer comprising zirconium, etc. was stacked on a magnetic recording layer in each of these media and then the diffusion of the magnetism-deactivating layer was performed by the ion beam irradiation using various kinds of gas.

The manufacture of each of these media was performed in the same manner as described in the case of the medium of Example 1. However, the kind of compound to be used as the magnetism-deactivating layer and the kind of gas to be used for the diffusion were changed as indicated above.

The media thus manufactured were respectively measured in terms of read/write characteristics, static magnetic characteristics, surface roughness and the content of zirconium in the magnetic recording layer. These measurements were performed in the same manner as described in Example 1.

The results thus measured are summarized in Table 2. In this Table 2, the read/write characteristics are shown as SNR, the static magnetic characteristic as Ms, and the surface roughness as Ra.

TABLE 2

|  | Demagnetizing layer | Gas | Content (at %) of Zr in non-recording portions | Ms of non-recording portions (emu/cc) | SNR (dB) | Ra (nm) |
|---|---|---|---|---|---|---|
| Ex. 11 | Zirconium | $N_2$ | 30 | 0 | 13.6 | 0.5 |
| Ex. 12 | Zirconium | He—$N_2$ | 30 | 0 | 13.9 | 0.2 |
| Ex. 13 | Zirconium nitride | $N_2$ | 30 | 0 | 12.5 | 0.5 |
| Ex. 14 | Zirconium nitride | He—$N_2$ | 30 | 0 | 12.8 | 0.3 |
| Ex. 15 | Zirconium carbide | $N_2$ | 30 | 0 | 11.4 | 0.5 |
| Ex. 16 | Zirconium carbide | He—$N_2$ | 30 | 0 | 11.6 | 0.4 |
| Ex. 17 | Zirconium oxide | $N_2$ | 30 | 0 | 11.3 | 0.4 |
| Ex. 18 | Zirconium oxide | He—$N_2$ | 30 | 0 | 11.8 | 0.3 |
| Ex. 19 | Zirconium boride | $N_2$ | 30 | 0 | 11.5 | 0.5 |
| Ex. 20 | Zirconium boride | He—$N_2$ | 30 | 0 | 11.8 | 0.3 |
| Comp. Ex. 10 | Zirconium | Kr | 30 | 130 | 8.9 | 2.2 |

As seen from Table 2, the media of Examples 11-20 indicated excellent SNR as compared with the medium of Comparative Example 10. The reason for this can be assumably attributed to the fact that while the magnetization (Ms) of the non-recording portions was made zero so that magnetic interference between bits was prevented in the cases of the media of Examples 11-20, the Ms of the non-recording portions was left so that magnetic interference between bits was allowed to take place in the medium of Comparative Example 10, resulting in an increase in noise. Furthermore, the surface roughness (Ra) of the media of Examples 11-20 was improved as compared with the medium of Comparative Example 10. Owing to this improvement, it was assumed that the head-floating characteristics of the medium of each of Examples was improved as compared with the medium of Comparative Example 10. Meanwhile, the existence of zirconium was not recognized in the recording regions in the media of Examples 11-20. On the other hand, the existence of zirconium was recognized in the non-recording regions as shown in Table 2.

Examples 21-29

Bit-patterned media of Examples 21-29 and Comparative Example 11 were manufactured and various characteristics thereof were investigated.

The general features of these media manufactured herein will be described below. A magnetism-deactivating layer comprising vanadium was stacked on a magnetic recording layer in each of these media and then the diffusion of the magnetism-deactivating layer was performed by the ion beam irradiation using $N_2$ gas.

The manufacture of each of these media was performed in the same manner as described in the case of the medium of Example 1. However, the treating time for the diffusion was changed as shown in Table 3.

The media thus manufactured were measured in terms of read/write characteristics, static magnetic characteristics, surface roughness, the content of vanadium in the magnetic recording layer, and the content of nitrogen. The measurements of read/write characteristics, static magnetic characteristics, surface roughness and the content of vanadium were performed in the same manner as described in Example 1. With respect to the content of nitrogen, together with the difference in height between protrusions and recesses, it was measured along the cross-section of the substrate using TEM and TEM-EDX.

The results thus measured are summarized in Table 3. In this Table 3, the read/write characteristics are shown as SNR, the static magnetic characteristics as Ms, and the surface roughness as Ra.

floating characteristics of the head was enabled to be further improved in the cases of the media of Examples 23-29. Incidentally, in the case of the medium of Comparative Example 11, since the medium was not subjected to any diffusion treatment, the non-recording portions were projected, thereby making them higher than the recording portions by about 6 nm, resulting in the deterioration of surface roughness.

As shown in Table 3, the media of Examples 21-29 indicated more excellent SNR as compared with the medium of Comparative Example 11. Especially, in the cases of the media where the content of vanadium in the non-recording portions was 20 at % or more, the Ms became approximately zero and the surface roughness thereof was not more than 0.5 nm, conceivably also resulting in the improvement of floating characteristics of the head. Further, it will be recognized that the media of Examples 21-29 indicated especially excellent SNR.

Furthermore, in the cases of the media of Examples 21-29, not only was vanadium not recognized in the recording regions, but also nitrogen. On the other hand, as shown in Table 3, it was possible to recognize the existence of vanadium and nitrogen in the non-recording regions.

Examples 30-38

Bit-patterned media of Examples 30-38 and Comparative Example 12 were manufactured and various characteristics thereof were investigated.

The general features of these media manufactured herein will be described below. A magnetism-deactivating layer comprising zirconium was stacked on a magnetic recording layer in each of these media and then the diffusion of the magnetism-deactivating layer was performed by the ion beam irradiation beam using $N_2$ gas.

The manufacture of each of these media was performed in the same manner as described in the case of the medium of Example 1. However, the treating time for the diffusion was changed as shown in Table 4.

The media thus manufactured were measured in terms of read/write characteristics, static magnetic characteristics,

TABLE 3

|  | Diffusion treating time (sec.) using $N_2$ | Content (at %) of V in non-recording portions | Content (at %) of N in non-recording portions | Ms of non-recording portions (emu/cc) | SNR (dB) | Ra (nm) |
| --- | --- | --- | --- | --- | --- | --- |
| Ex. 21 | 5 | 10 | 2 | 19 | 11.0 | 0.9 |
| Ex. 22 | 15 | 15 | 2 | 18 | 11.1 | 0.9 |
| Ex. 23 | 30 | 20 | 5 | 5 | 13.0 | 0.5 |
| Ex. 24 | 60 | 25 | 6 | 3 | 13.3 | 0.4 |
| Ex. 25 | 100 | 30 | 7 | 0 | 13.7 | 0.4 |
| Ex. 26 | 300 | 35 | 8 | 0 | 13.6 | 0.3 |
| Ex. 27 | 500 | 40 | 7 | 0 | 13.8 | 0.3 |
| Ex. 28 | 800 | 45 | 8 | 0 | 13.6 | 0.4 |
| Ex. 29 | 1000 | 50 | 10 | 0 | 13.5 | 0.5 |
| Comp. Ex. 11 | 0 | 0 | 0 | 500 | 3.2 | 3.5 |

It was found from the image obtained from the TEM observation in the cross-sectional direction that, in the cases of the media of Examples 21 and 22, the level of the non-recording portions was lower than the level of the recording portions by about 3-4 nm (see FIG. 4K), but in the cases of the media of Examples 23-29, no difference in level could be recognized between the non-recording portions and the recording portions (see FIG. 5K). This phenomenon can be assumably attributed to the fact that, in the cases of the media of Examples 23-29, vanadium nitride was formed at the non-recording portions and, due to the creation of the nitride, the volume of the non-recording portions was caused to expand. It is conceivable that, as a result of this phenomenon, the surface roughness, the content of zirconium in the magnetic recording layer, and the content of nitrogen. The measurements of read/write characteristics, static magnetic characteristics, surface roughness and the content of zirconium were performed in the same manner as described in Example 1. With respect to the content of nitrogen, together with the difference in height between protrusions and recesses, it was measured along the cross-section of the substrate using TEM and TEM-EDX.

The results thus measured are summarized in Table 4. In this Table 4, the read/write characteristics are shown as SNR, the static magnetic characteristics as Ms, and the surface roughness as Ra.

TABLE 4

|  | Diffusion treating time (sec.) using $N_2$ | Content (at %) of Zr in non-recording portions | Content (at %) of N in non-recording portions | Ms of non-recording portions (emu/cc) | SNR (dB) | Ra (nm) |
|---|---|---|---|---|---|---|
| Ex. 30 | 10 | 10 | 2 | 17 | 11.4 | 0.8 |
| Ex. 31 | 20 | 15 | 2 | 16 | 11.8 | 0.7 |
| Ex. 32 | 40 | 20 | 8 | 2 | 13.4 | 0.4 |
| Ex. 33 | 70 | 25 | 9 | 1 | 13.5 | 0.3 |
| Ex. 34 | 120 | 30 | 9 | 0 | 13.8 | 0.3 |
| Ex. 35 | 330 | 35 | 10 | 0 | 13.9 | 0.2 |
| Ex. 36 | 540 | 40 | 10 | 0 | 13.9 | 0.2 |
| Ex. 37 | 850 | 45 | 10 | 0 | 13.8 | 0.3 |
| Ex. 38 | 1200 | 50 | 11 | 0 | 13.8 | 0.4 |
| Comp. Ex. 12 | 0 | 0 | 0 | 500 | 3.8 | 3.7 |

It was found from the image obtained from the TEM observation in the cross-sectional direction that, in the cases of the media of Examples 30 and 31, the level of the non-recording portions was lower than the level of the recording portions by about 3-4 nm (see FIG. 4K), but in the cases of the media of Examples 32-38, no difference in level could be recognized between the non-recording portions and the recording portions (see FIG. 5K). This phenomenon can be assumably attributed to the fact that, in the cases of the media of Examples 32-38, zirconium nitride was formed at the non-recording portions and, due to the creation of the nitride, the volume of the non-recording portions was caused to expand. It is conceivable that, as a result of this phenomenon, the floating characteristics of the head were enabled to be further improved in the cases of the media of Examples 32-38. Incidentally, in the case of the medium of Comparative Example 12, since the medium was not subjected to any diffusion treatment, the non-recording portions were projected, thereby making them higher than the recording portions by about 6 nm, resulting in the deterioration of surface roughness.

As shown in Table 4, the media of Examples 30-38 indicated more excellent SNR as compared with the medium of Comparative Example 12. Especially, in the cases of the media where the content of zirconium in the non-recording portions was 20 at % or more, the Ms became approximately zero and the surface roughness thereof was not more than 0.5 nm, conceivably also resulting in the improvement of floating characteristics of the head. Further, it will be recognized that the media of Examples 30-38 indicated especially excellent SNR.

Furthermore, in the cases of the media of Examples 30-38, not only was zirconium not recognized in the recording regions, but also nitrogen. On the other hand, as shown in Table 4, it was possible to recognize the existence of zirconium and nitrogen in the non-recording regions.

Examples 39-54

Bit-patterned media of Examples 39-54 were manufactured and various characteristics thereof were investigated.

The general features of these media manufactured herein will be described below. A magnetism-deactivating layer comprising vanadium or zirconium was stacked on a magnetic recording layer in each of these media and then the diffusion of the magnetism-deactivating layer was performed by the ion beam irradiation using various kinds of gas.

The manufacture of each of these media was performed in the same manner as described in the case of the medium of Example 1. However, the kind of compound to be used as the magnetism-deactivating layer and the kind of gas to be used for the diffusion were changed as indicated above.

The media thus manufactured were measured in terms of read/write characteristics, static magnetic characteristics, surface roughness, the content of the metal element (vanadium or zirconium) in the magnetic recording layer and the content of the gas used for the diffusion. These measurements were performed in the same manner as described in Example 1. With respect to the measurement of the content of gas, since it was difficult to detect He through the measurement using TEM-EDX, the results described hereinafter do not include the results measured of He.

The results thus measured are summarized in Table 5. In this Table 5, the read/write characteristics are shown as SNR, the static magnetic characteristics as Ms, and the surface roughness as Ra.

TABLE 5

|  | Demagnetizing layer (metal element) | Gas | Content (at % or mol %) of metal element in non-recording portions | Content (at %) of gas in non-recording portions (excluding He) | Ms of non-recording portions (emu/cc) | SNR (dB) | Ra (nm) |
|---|---|---|---|---|---|---|---|
| Ex. 39 | Vanadium | $CH_4$ | 30 | 7 | 0 | 11.5 | 0.4 |
| Ex. 40 | Vanadium | $B_2H_6$ | 30 | 9 | 0 | 11.7 | 0.5 |
| Ex. 41 | Vanadium | $O_2$ | 30 | 6 | 0 | 11.4 | 0.5 |
| Ex. 42 | Vanadium | $O_3$ | 30 | 9 | 0 | 11.9 | 0.5 |
| Ex. 43 | Vanadium | $CH_4$ + He | 30 | 8 | 0 | 12.1 | 0.3 |
| Ex. 44 | Vanadium | $B_2H_6$ + He | 30 | 10 | 0 | 12.3 | 0.4 |
| Ex. 45 | Vanadium | $O_2$ + He | 30 | 7 | 0 | 12.4 | 0.4 |
| Ex. 46 | Vanadium | $O_3$ + He | 30 | 9 | 0 | 12.6 | 0.4 |
| Ex. 47 | Zirconium | $CH_4$ | 30 | 8 | 0 | 11.6 | 0.5 |
| Ex. 48 | Zirconium | $B_2H_6$ | 30 | 10 | 0 | 11.8 | 0.5 |
| Ex. 49 | Zirconium | $O_2$ | 30 | 7 | 0 | 11.7 | 0.4 |
| Ex. 50 | Zirconium | $O_3$ | 30 | 9 | 0 | 11.8 | 0.5 |

TABLE 5-continued

| | Demagnetizing layer (metal element) | Gas | Content (at % or mol %) of metal element in non-recording portions | Content (at %) of gas in non-recording portions (excluding He) | Ms of non-recording portions (emu/cc) | SNR (dB) | Ra (nm) |
|---|---|---|---|---|---|---|---|
| Ex. 51 | Zirconium | $CH_4$ + He | 30 | 9 | 0 | 12.3 | 0.3 |
| Ex. 52 | Zirconium | $B_2H_6$ + He | 30 | 11 | 0 | 12.6 | 0.4 |
| Ex. 53 | Zirconium | $O_2$ + He | 30 | 8 | 0 | 12.8 | 0.3 |
| Ex. 54 | Zirconium | $O_3$ + He | 30 | 11 | 0 | 12.7 | 0.4 |

In the cases of Examples 39-54, it was impossible to recognize the existence of a metal element (vanadium or zirconium), carbon, oxygen or boron in the recording portions. Whereas, it was possible to recognize, in the non-recording portions, the existence of a metal element (vanadium or zirconium) and also the elements of gas (carbon, oxygen and boron) used for the diffusion as shown in Table 5.

Further, as shown in Table 5, the media of Examples 39-54 were found to be excellent in SNR, Ms of the non-recording portions and surface roughness.

Incidentally, although $CH_4$ was employed as a gas containing carbon, $O_2$ as a gas containing oxygen, and $B_2H_6$ as a gas containing boron in these examples, it is also possible to employ other kinds of gas in obtaining the same effects as described above as long as the gas to be used contains carbon, oxygen or boron.

Examples 55-62

Bit-patterned media of Examples 55-62 and Comparative Examples 13 and 14 were manufactured and various characteristics thereof were investigated.

The general features of these media manufactured herein will be described below. A magnetism-deactivating layer comprising vanadium was stacked on a magnetic recording layer (CoCrPt—$SiO_2$) in each of these media and then the diffusion of the magnetism-deactivating layer was performed by the ion beam irradiation using $O_2$ gas.

The manufacture of each of these media was performed in the same manner as described in the case of the medium of Example 1. However, (Co-20 at % Pt-14 at % Cr)-10 mol % $SiO_2$ was used as a magnetic recording medium in place of Co-20 at % Pt-10 at % Cr, oxygen gas was used as a gas for the diffusion, and the gas pressure and the treating time for the diffusion were changed as shown in Table 6.

The media thus manufactured were measured in terms of read/write characteristics, static magnetic characteristics, surface roughness, and the content of oxygen in the magnetic recording layer. The measurements of read/write characteristics, static magnetic characteristics, surface roughness and the content of vanadium were performed in the same manner as described in Example 1. With respect to the content of oxygen, it was measured along the cross-section of the substrate by making use of TEM-EDX, thereby measuring the content of oxygen in the cross-section of the medium.

The results thus measured are summarized in Table 6. In this Table 6, the read/write characteristics are shown as SNR, the static magnetic characteristics as Ms, and the surface roughness as Ra.

TABLE 6

| | Diffusion treating time (sec.) | Gas pressure (Pa) | Content (at %) of O element in recording portions | Content (at %) of O element in non-recording portions | Ms of non-recording portions (emu/cc) | SNR (dB) | Ra (nm) |
|---|---|---|---|---|---|---|---|
| Ex. 55 | 50 | 0.1 | 20 | 22 | 19 | 11.0 | 0.9 |
| Ex. 56 | 80 | 0.1 | 20 | 23 | 5 | 11.3 | 0.8 |
| Ex. 57 | 100 | 0.1 | 20 | 25 | 0 | 11.5 | 0.5 |
| Ex. 58 | 100 | 0.2 | 20 | 28 | 0 | 11.7 | 0.5 |
| Ex. 59 | 100 | 0.3 | 20 | 30 | 0 | 11.8 | 0.4 |
| Ex. 60 | 100 | 0.5 | 20 | 32 | 0 | 11.9 | 0.3 |
| Ex. 61 | 100 | 0.7 | 20 | 35 | 0 | 12.0 | 0.3 |
| Ex. 62 | 100 | 1.0 | 20 | 40 | 0 | 12.1 | 0.3 |
| Comp. Ex. 13 | 0 | 0.1 | 20 | 20 | 500 | 3.8 | 3.7 |
| Comp. Ex. 14 | 30 | 0.1 | 20 | 21 | 250 | 5.6 | 2.4 |

The content of oxygen in the recording portions in each of the media of Examples 55-62 was found to be the same as the composition of the material and no dependence thereof on the treating time of diffusion as well as on the gas pressure was recognized. Whereas, in the non-recording portions, the content of oxygen was increased in accordance with an increase in treating time of diffusion or an increase in gas pressure.

Further, as shown in Table 6, the media of Examples 55-62 were found to be excellent in SNR, in Ms of the non-recording portion and in surface roughness as compared with the media of Comparative Examples 13 and 14.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium comprising a substrate, a soft magnetic layer formed on the substrate, an underlayer formed on the soft magnetic layer, a magnetic recording layer formed on the underlayer, and a protective layer formed on the magnetic recording layer,
    wherein the magnetic recording layer is provided with a pattern constituted by recording portions and non-recording portions,
    the non-recording portions have a composition that is formed by demagnetizing recording portions,
    the non-recording portions comprise at least one metal element selected from the group consisting of vanadium and zirconium and at least one second element selected from the group consisting of nitrogen, carbon, boron, and oxygen, and
    the content of the at least one second element in the non-recording portions is at least about 2 atomic % higher than the content of the at least one second element in the recording portions.

2. The magnetic recording medium of claim 1, wherein the content of the at least one second element in the non-recording portions is at least about 5 atomic % higher than the content of the at least one second element in the recording portions.

3. The magnetic recording medium of claim 1, wherein the content of the at least one metal element contained in the non-recording portions is about 10 atomic % or more.

4. The magnetic recording medium of claim 1, wherein the content of the at least one metal element contained in the non-recording portions is about 20 atomic % or more.

5. A magnetic recording apparatus comprising:
    the magnetic recording medium of claim 1; and
    a magnetic recording head.

6. The magnetic recording medium of claim 1, wherein the metal element is vanadium.

7. The magnetic recording medium of claim 1, wherein the metal element is zirconium.

8. A magnetic recording medium comprising a substrate, a soft magnetic layer formed on the substrate, an underlayer formed on the soft magnetic layer, a magnetic recording layer formed on the underlayer, and a protective layer formed on the magnetic recording layer,
    wherein the magnetic recording layer is provided with a pattern constituted by recording portions and non-recording portions,
    the non-recording portions have a composition that is formed by demagnetizing recording portions,
    the non-recording portions comprise at least one metal element selected from the group consisting of vanadium and zirconium and at least one second element which is nitrogen, and
    the content of the at least one second element in the non-recording portions is larger than the content of the least one second element in the recording portions.

9. The magnetic recording medium of claim 8, wherein the content of the at least one second element in the non-recording portions is at least about 2 atomic % higher than the content of the at least one second element in the recording portions.

10. The magnetic recording medium of claim 8, wherein the content of the at least one second element in the non-recording portions is at least about 5 atomic % higher than the content of the at least one second element in the recording portions.

11. The magnetic recording medium of claim 1, wherein the content of the at least one metal element contained in the non-recording portions is about 10 atomic % or more.

12. The magnetic recording medium of claim 1, wherein the content of the at least one metal element contained in the non-recording portions is about 20 atomic % or more.

13. A magnetic recording apparatus comprising:
    the magnetic recording medium of claim 8; and
    a magnetic recording head.

14. The magnetic recording medium of claim 8, wherein the metal element is vanadium.

15. The magnetic recording medium of claim 8, wherein the metal element is zirconium.

* * * * *